US011242994B2

(12) United States Patent
Guezel et al.

(10) Patent No.: US 11,242,994 B2
(45) Date of Patent: Feb. 8, 2022

(54) COMBUSTION CHAMBER FOR A TURBOMACHINE

(71) Applicant: Safran Aircraft Engines, Paris (FR)

(72) Inventors: Yvan Yoann Guezel, Moissy-Cramayel (FR); François Xavier Chapelle, Moissy-Cramayel (FR); Romain Nicolas Lunel, Moissy-Cramayel (FR)

(73) Assignee: Safran Aircraft Engines, Paris (FR)

( * ) Notice: Subject to any disclaimer, the term of this patent is extended or adjusted under 35 U.S.C. 154(b) by 209 days.

(21) Appl. No.: 16/433,078

(22) Filed: Jun. 6, 2019

(65) Prior Publication Data

US 2019/0376689 A1  Dec. 12, 2019

(30) Foreign Application Priority Data

Jun. 7, 2018 (FR) .................................... 1854962

(51) Int. Cl.
*F23R 3/14* (2006.01)
*F23R 3/28* (2006.01)
*F23R 3/00* (2006.01)

(52) U.S. Cl.
CPC .............. *F23R 3/286* (2013.01); *F23R 3/002* (2013.01); *F23R 3/14* (2013.01); *F23R 3/283* (2013.01)

(58) Field of Classification Search
CPC .................................... F23R 3/14; F23R 3/286
See application file for complete search history.

(56) References Cited

U.S. PATENT DOCUMENTS

| 4,914,918 A * | 4/1990 | Sullivan | F23D 11/36 60/756 |
| 5,117,637 A * | 6/1992 | Howell | F23R 3/283 60/740 |
| 5,129,231 A * | 7/1992 | Becker | F23R 3/10 60/754 |
| 5,894,732 A * | 4/1999 | Kwan | F23R 3/283 60/748 |
| 5,941,076 A * | 8/1999 | Sandelis | F23R 3/10 60/752 |
| 5,956,955 A * | 9/1999 | Schmid | F23R 3/283 60/748 |
| 6,035,645 A * | 3/2000 | Bensaadi | F23R 3/14 60/742 |
| 6,212,870 B1 * | 4/2001 | Thompson | F23R 3/283 60/772 |
| 6,279,323 B1 * | 8/2001 | Monty | F23R 3/06 60/752 |

(Continued)

FOREIGN PATENT DOCUMENTS

EP  0 724 119 A2  7/1996
FR  2 928 994 A1  9/2009

*Primary Examiner* — William H Rodriguez
(74) *Attorney, Agent, or Firm* — Blank Rome LLP

(57) ABSTRACT

A combustion chamber for a turbomachine having a bottom wall, at least one mixing bowl for promoting the mixing of air and fuel, mounted in an opening in the bottom wall, at least one annular baffle mounted axially downstream of the bottom wall, with respect to the direction of the gas flow within the combustion chamber, around the opening. The baffle is produced in one piece with the mixing bowl so as to form a one-piece assembly that has at least one channel for the flow of cooling air. The channel has an air inlet located upstream of the bottom wall and an air outlet located downstream of the bottom wall. The air outlet is located radially opposite the baffle.

14 Claims, 4 Drawing Sheets

(56) References Cited

U.S. PATENT DOCUMENTS

| | | | | |
|---|---|---|---|---|
| 6,314,739 B1* | 11/2001 | Howell | | F01D 11/005 60/748 |
| 6,381,964 B1* | 5/2002 | Pritchard, Jr. | | F23R 3/14 60/746 |
| 6,442,940 B1* | 9/2002 | Young | | F23R 3/14 29/890.01 |
| 6,530,227 B1* | 3/2003 | Young | | F23D 14/78 60/748 |
| 6,546,732 B1* | 4/2003 | Young | | F23D 14/78 60/740 |
| 7,861,530 B2* | 1/2011 | Hawie | | F23R 3/002 60/752 |
| 2003/0061815 A1 | 4/2003 | Young et al. | | |
| 2004/0065090 A1* | 4/2004 | Al-Roub | | F23R 3/14 60/776 |
| 2005/0247065 A1* | 11/2005 | Dudebout | | F23R 3/286 60/776 |
| 2006/0207258 A1* | 9/2006 | Tanner | | F16L 27/08 60/748 |
| 2007/0033950 A1* | 2/2007 | Bernier | | F23R 3/14 60/796 |
| 2007/0119052 A1* | 5/2007 | Caldwell | | F23R 3/14 29/888.011 |
| 2007/0125085 A1* | 6/2007 | Commaret | | F23R 3/14 60/748 |
| 2007/0269757 A1* | 11/2007 | Commaret | | F23R 3/286 431/265 |
| 2008/0000447 A1* | 1/2008 | Locatelli | | F23R 3/283 123/306 |
| 2008/0168773 A1* | 7/2008 | Sandelis | | F23R 3/14 60/748 |
| 2008/0202122 A1* | 8/2008 | Guezengar | | F23R 3/002 60/722 |
| 2016/0363319 A1* | 12/2016 | Monahan | | F23R 3/286 |
| 2018/0003385 A1* | 1/2018 | Rodrigues | | F23R 3/286 |
| 2019/0086088 A1* | 3/2019 | Stevens | | F23R 3/50 |

\* cited by examiner

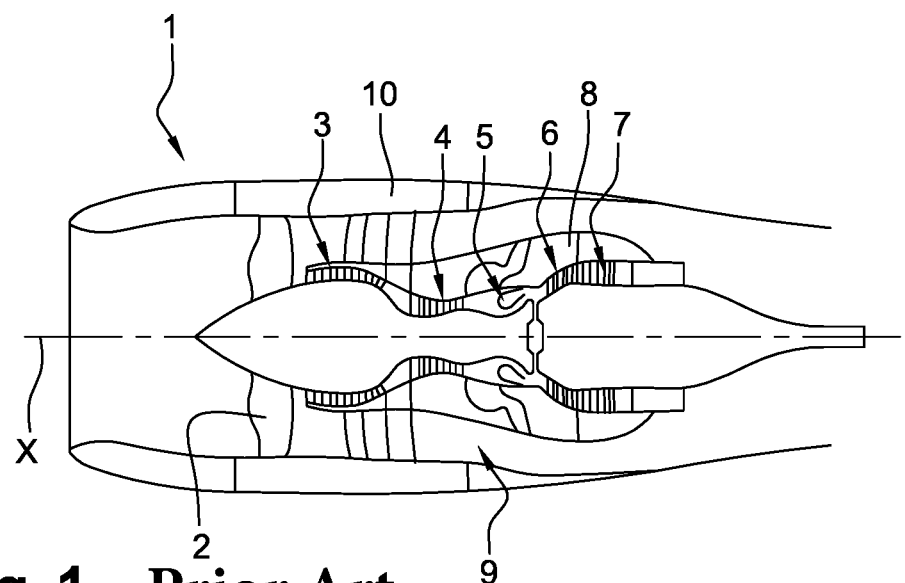
Fig. 1 - Prior Art
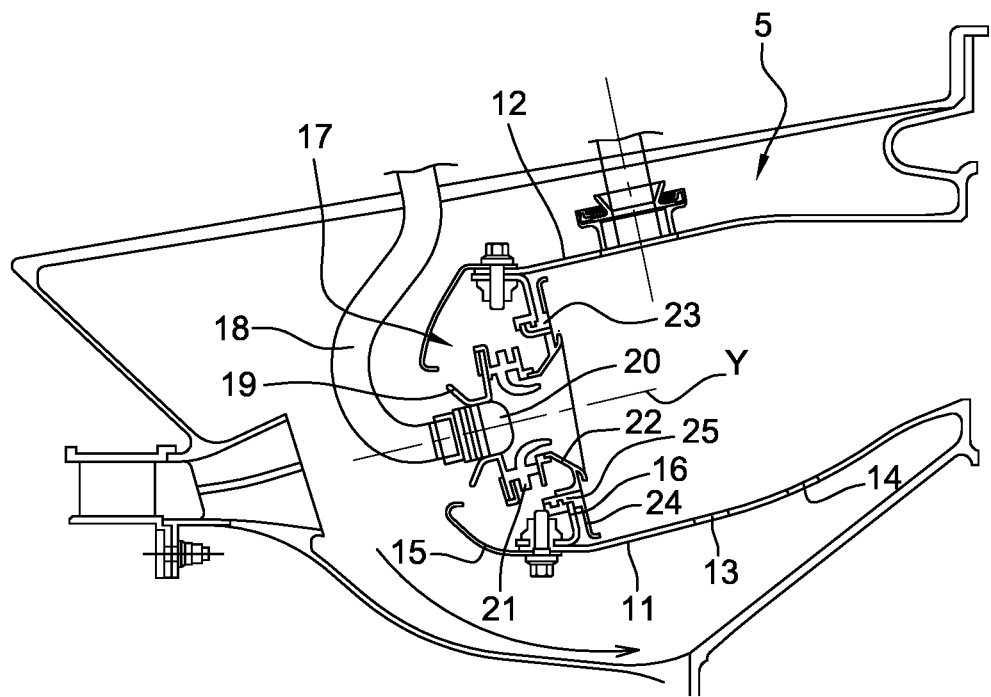
Fig. 2 - Prior Art

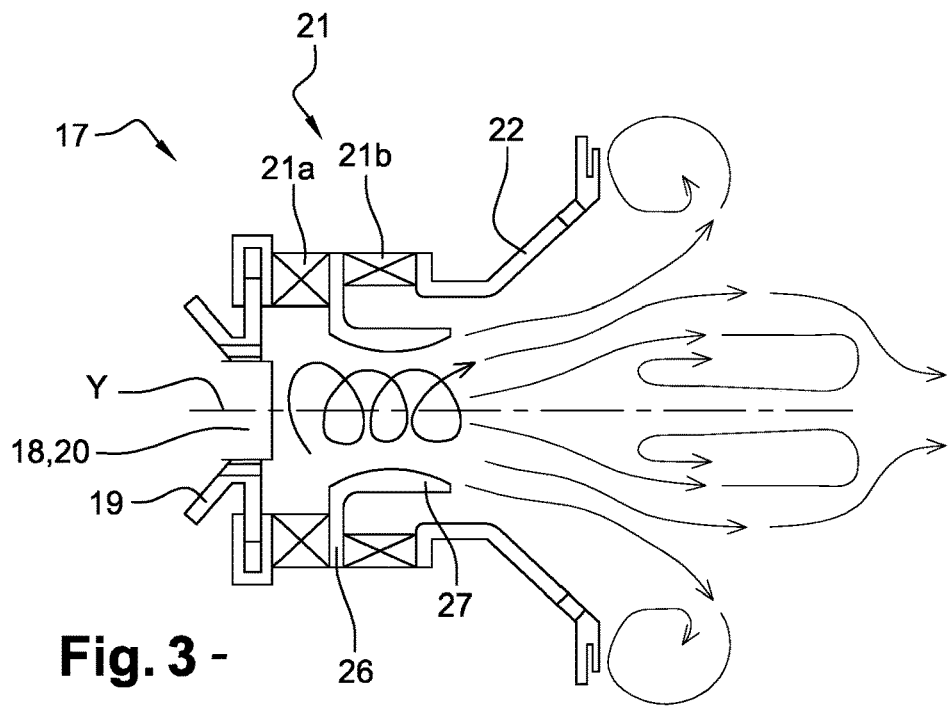
Fig. 3 - Prior Art
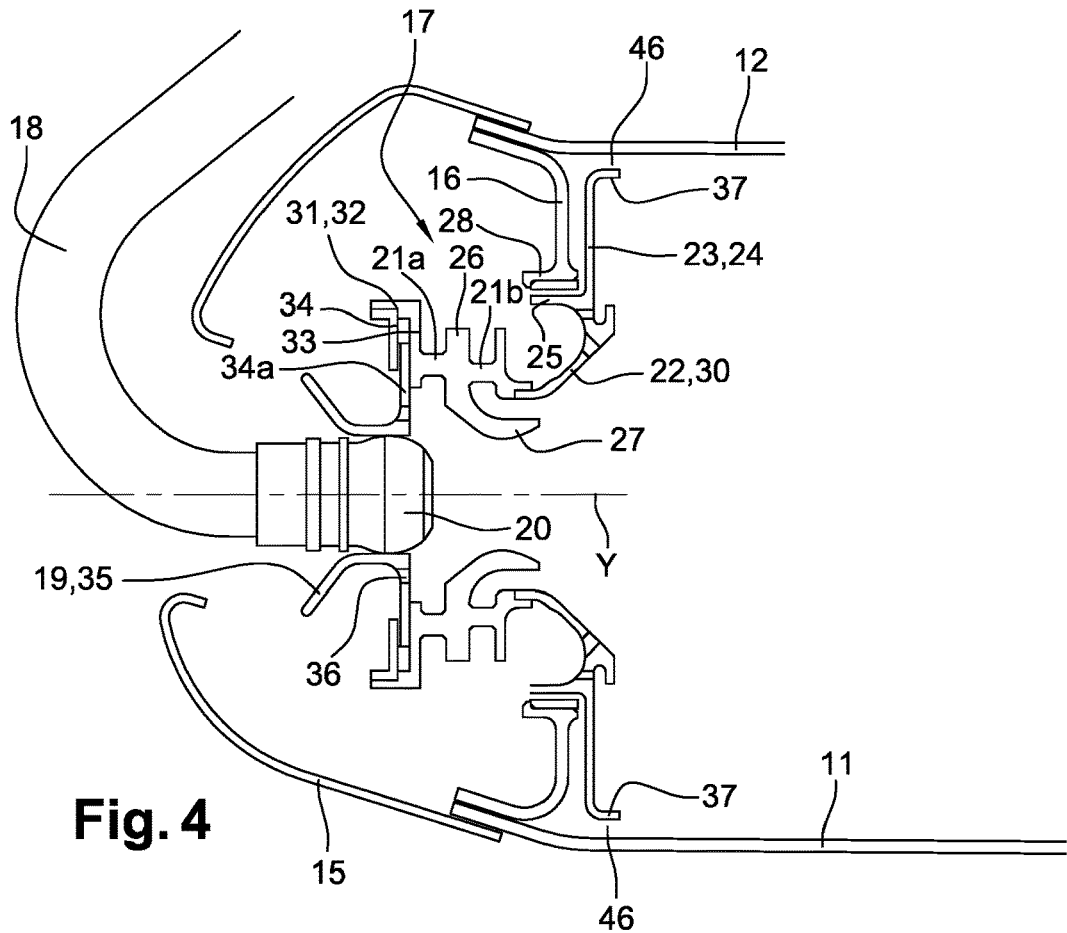
Fig. 4

US 11,242,994 B2

COMBUSTION CHAMBER FOR A TURBOMACHINE

This application claims priority to French Patent Application No. 1854962, filed Jun. 7, 2018, the entirety of which is incorporated by reference herein.

TECHNICAL FIELD

The present invention relates to a combustion chamber for a turbomachine, such as, for instance, an aircraft turbojet engine or a turboprop engine.

BACKGROUND

FIG. 1 shows a turbomachine 1 from the prior art, in particular a turbofan engine.

The air or gas flow through the turbomachine 1 is directed in the downstream direction, i. e. from the left to the right in FIG. 1.

The turbomachine, having an X axis, conventionally includes a fan 2, downstream of which:

a primary section extends, wherein a primary flow circulates, said primary section passing through, in the direction of the primary flow circulation, a low-pressure compressor 3, a high-pressure compressor 4, a combustion chamber 5, a high-pressure turbine 6 and a low-pressure turbine 7, the primary section being externally delimited at the turbine by a turbine case 8;

a secondary section extends, wherein a secondary flow, distinct from the primary flow, circulates.

The secondary section 9 is surrounded by a nacelle 10 forming a fairing for the turbomachine 1.

FIG. 2 shows the combustion chamber 5 of the turbine engine 1 of FIG. 1. The combustion chamber 5 is annular and has a radially inner annular shell 11 and a radially outer annular shell 12, said shells 11, 12 being coaxial and having an X axis. The shells 11, 12 typically have holes 13 allowing the passage of so-called primary air and holes 14 allowing the passage of so-called dilution air.

Fairings 15 are mounted on the upstream ends of the shells 11, 12.

The shells 11, 12 are connected at their upstream end by an annular chamber bottom wall 16 equipped with air and fuel injection systems 17, evenly distributed around the X axis and partly housed in the volume delimited by the fairings 15.

As best shown in FIG. 3, each air and fuel injection system 17 has a fuel injection rod 18, a sleeve 19 mounted around the end or nose 20 of the rod, an annular air intake or injection device 21, a mixing bowl or a vaporizing bowl 22 and a baffle 23. The air injection device 21 and the bowl 22 can be formed in one piece or, on the contrary, they can be formed in two separate pieces.

In the following description, the terms axial, radial and circumferential are defined in relation to a so-called injection Y axis, corresponding to the axis of the sleeve and the device.

The device 21 here forms two air injection swirlers 21a, 21b. The swirlers 21a, 21b are separated from each other by an annular wall 26 which extends radially inward to form an inner annular deflection wall 27, also called a venturi, having an inner profile of convergent and then divergent shape, in the downstream direction.

Each swirler 21a, 21b typically has an annular row of fins that are inclined to rotate the airflow and thus improve the atomization or vaporization of the fuel jet from the nose 20 of the fuel injection rod 18. In particular, some of this fuel streams in liquid form on the inner surface of the venturi 27 and is sheared by swirling air at the downstream end of the venturi (schematically shown as arrows in FIG. 3).

Fuel vaporization and mixing of air and fuel continue downstream of the swirlers 21a, 21b, in the bowl 22 and then in the upstream part of the combustion chamber 5, where the premixture of air and fuel from the bowl 22 is further mixed with air from the primary holes 13 and the dilution holes 14.

The device 21 is mounted in the baffle 23, which is partially mounted in an opening in the bottom of the chamber 16. The baffle 23 has an annular part radially extending 24 around the opening and located downstream of the chamber bottom 16 so as to form a thermal barrier to prevent the premature degradation of the chamber bottom.

The baffle comprises in particular a cylindrical part 25 attached by brazing to the edge of the opening of the chamber bottom 16, the radial annular part 24 extending from the downstream end of the cylindrical part 25.

The baffle 23 is subjected to high thermal stresses in operation, which can cause seams or cracks in the soldering area with the chamber bottom 16 and/or in the base of the radial annular part 24, i. e. at the connection between the cylindrical part 25 and the radial annular part 24.

In addition, the structure of the air injection system 17 is relatively complex and has a large axial space requirement, particularly in the area of the mounting between the baffle 23 and the bowl 22.

SUMMARY

One of the aims of the invention is to provide a simple, effective and economical solution to these problems.

For this purpose, the invention relates to a combustion chamber for a turbomachine having a bottom wall, at least one mixing bowl for promoting the mixing of air and fuel, mounted in an opening in the bottom wall, at least one annular baffle mounted axially downstream of the bottom wall, with respect to the direction of the gas flow within the combustion chamber, around said opening, the baffle being produced in one piece with the mixing bowl so as to form a one-piece assembly, characterized in that said assembly comprises at least one channel for the flow of cooling air, said channel comprising an air inlet located upstream of the bottom wall and an air outlet located downstream of the bottom wall, said air outlet being located radially opposite the baffle.

As indicated above, the terms axial, radial and circumferential are defined in relation to the axis of the opening, which is generally confused with the axis of the above-mentioned assembly.

The fact that the baffle and the mixing bowl are made in one piece reduces the axial space requirement of the assembly. The mixing bowl is also called a vaporizing bowl or pre-mixing bowl. As is known in itself, the bowl may have a tapered annular wall that widens in the downstream direction.

In addition, the formation of a channel opening out opposite the baffle improves its cooling and also allows the area of the assembly in which the channel is formed to be cooled. This reduces the risk of seams and cracks in these areas.

Said assembly may comprise a cylindrical attachment part, attached to the bottom of the chamber and mounted radially inside the opening, the baffle comprising a radially inner base part connected to said attachment part, the channel being provided in the cylindrical attachment part, the air outlet of the channel being located radially opposite the base of the baffle.

The air from the canal then impacts more specifically the base of the baffle, which is one of the areas in which the appearance of seams or cracks has been observed in the prior art. The risk of degradation in this area is therefore specifically reduced.

The combustion chamber may have at least one air intake swirler capable of generating a rotary air flow, located upstream of the mixing bowl.

As mentioned above, such a swirler enables the fuel to be atomized or vaporized, so as to achieve a homogeneous premixture of air and fuel.

The attachment part can axially extend in the upstream direction from the radially outer periphery of the mixing bowl, the baffle extending radially outward from the radially outer periphery of the mixing bowl.

The radially outer periphery of the baffle may have a downstream extending rim located in the vicinity of said corresponding shell and radially offset from said shell.

In this way, the cooling air reaching the space provided axially between the chamber bottom and the radial annular part of the baffle can reach the combustion chamber through the spaces provided between the rims of the baffles and the related shells. This cooling air reaching the chamber then forms films of air that lick, cool and protect the corresponding shells.

The assembly can include a plurality of channels intended for the flow of cooling air, evenly distributed over the circumference.

The cross-section of each channel can be substantially constant from the upstream end of said channel to the downstream end of said channel.

The cross-section of each channel can axially decrease in the downstream direction.

This feature increases the speed of the cooling air flow that impacts the baffle at the outlet of the channel, which can improve cooling in the relevant area of the baffle.

The at least one channel for the flow of cooling air can be delimited by a radially inner surface and a radially outer surface, in the form of a cylinder or cone portion, said radially inner and outer surfaces being coaxial.

Two adjacent channels can be separated circumferentially by a connecting wall, said connecting wall having an upstream end and a downstream end, said upstream end being rounded.

The cylindrical attachment part of the assembly can be attached by brazing or welding to a cylindrical part of the bottom wall, formed on the radially outer periphery of the opening.

The cylindrical part of the bottom wall may have an upstream shoulder, the upstream end of the cylindrical part of the assembly being able to come to rest on said shoulder. The upstream end of the cylindrical part of the assembly can be attached by brazing or welding to the shoulder.

The assembly can be made of a nickel- and/or cobalt-based super alloy. The assembly can be carried out by an additive manufacturing method, for example by selective melting or selective powder sintering, using an electron beam or a laser beam.

The invention also relates to a turbomachine for an aircraft comprising an assembly of the aforementioned type.

The invention will be better understood and other details, characteristics and advantages of the invention will appear when reading the following description, which is given as a non-limiting example, with reference to the attached drawings.

BRIEF DESCRIPTION OF THE DRAWINGS

FIG. 1 is a schematic view in axial cross-section of a prior art turbomachine;

FIG. 2 is an axial cross-sectional view showing a combustion chamber of the turbomachine of FIG. 1;

FIG. 3 is a schematic view of an injection system provided in the combustion chamber of FIG. 2;

FIG. 4 is a view in axial cross-section of a portion of a combustion chamber according to one embodiment of the invention;

DETAILED DESCRIPTION

Figure 5:
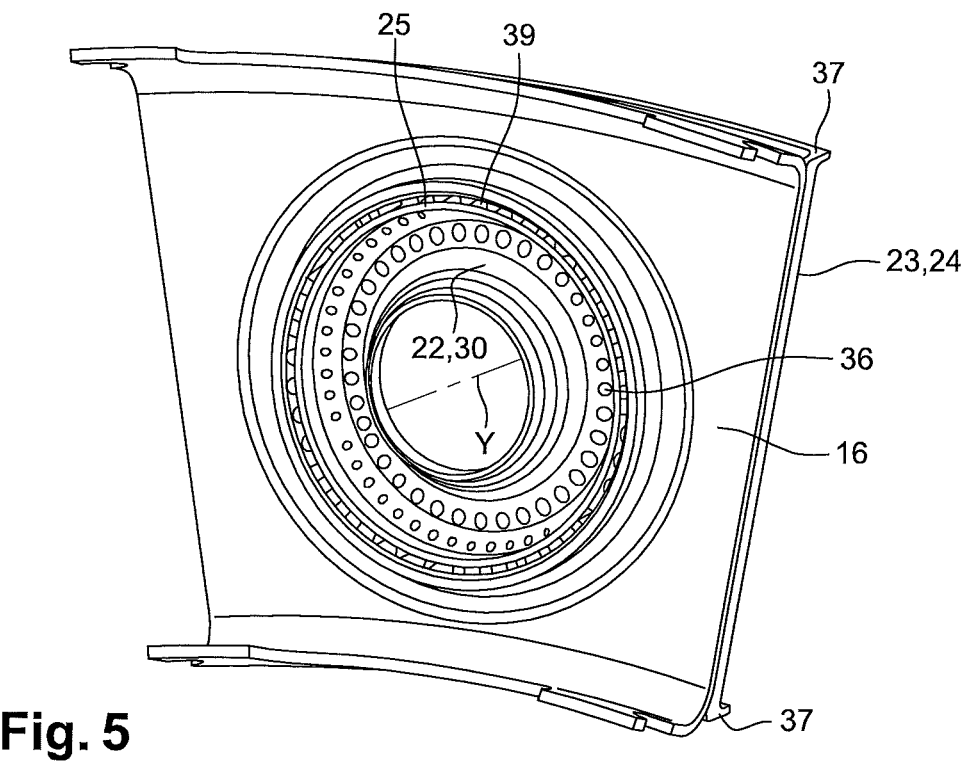
FIG. 5 is a perspective view showing a part of the bottom of the chamber and a part of the assembly forming in particular the baffle and the mixing bowl, in accordance with the invention.

A combustion chamber 5 according to one embodiment is shown in FIGS. 4 to 7. This chamber includes a radially inner annular shell 11 and a radially outer annular shell 12, with respect to the X axis of the turbomachine, said shells 11, 12 being coaxial.

Annular fairings 15 are mounted at the upstream ends of the shells 11, 12 and delimit an annular volume.

Figure 6:
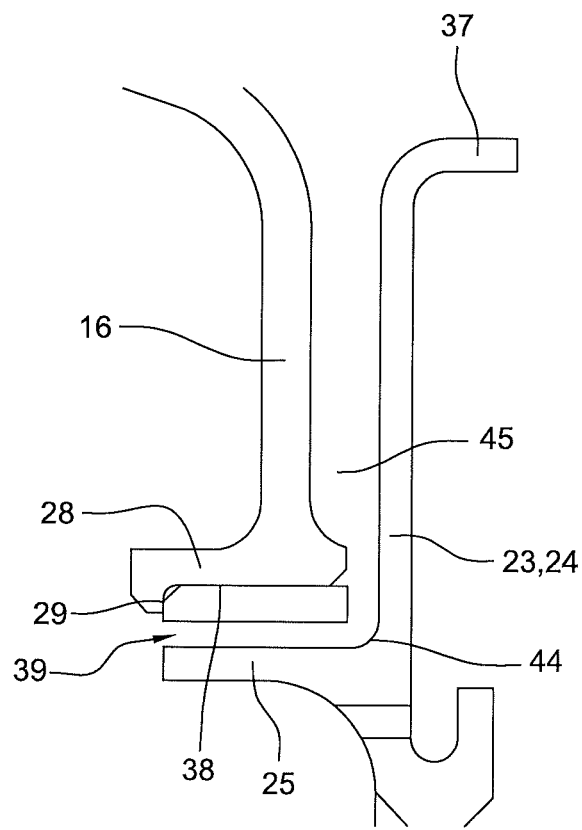
FIG. 6 is a detailed view of FIG. 4.

The shells 11, 12 are connected at their upstream end by a radial annular wall at the bottom of the chamber 16. The bottom of the chamber 16 has Y-axis openings, evenly distributed over the circumference. In particular, the edge of each opening is delimited by a cylindrical attachment part 28. The cylindrical part 28 has a shoulder 29 at its upstream end (FIG. 6).

An assembly 30 forming both a mixing bowl 22 and a baffle 23 protecting the bottom of the chamber 16, is mounted and attached in each opening of the bottom of the chamber 16.

An air intake or injection device 21 is mounted upstream of the assembly 30.

The device 21 has an annular Y axis and has, in the downstream direction, a part 31 being used to mount a sleeve 19, an upstream air intake or injection swirler 21a and a downstream air intake or injection swirler 21b.

The upstream part 31 of the device 21 comprises a cylindrical part 32 and a radial part 33, a washer 34 being attached in the cylindrical part 32. The washer 34 is axially offset from the radial part 33 so as to form a groove used for mounting a flange 34a of the sleeve 19. The sleeve 19 also has a tapered part 35 surrounding the nose 20 of a fuel injection rod 18. Fuel injection is carried out along the Y axis.

The swirlers 21a, 21b are separated from each other by an annular wall 26 which extends radially inward to form an inner annular deflection wall 27, also called a venturi, having an inner profile of convergent and then divergent shape, in the downstream direction.

Each swirler 21a, 21b typically has an annular row of fins that are inclined to rotate the air flow and thus improve the atomization or vaporization of the fuel jet from the nose 20 of the fuel injection rod 18. In particular, some of this fuel streams in liquid form on the inner surface of the venturi 27 and is sheared by the swirling air at the downstream end of the venturi 27.

The bowl 22 is formed by a tapered annular wall that widens in the downstream direction. Said tapered wall has holes 36 (FIGS. 4 and 5) enabling the passage of the cooling air from the internal volume delimited by the fairings 15 to the combustion chamber 5.

The baffle 23 is formed at the radially outer downstream periphery of the bowl 22. In particular, the baffle 23 has a cylindrical axial part 25 extending in the upstream direction from the outer periphery of the bowl 22 and a part 24 extending radially outward from the downstream end of the cylindrical part 25. The peripheries of the radial part 24 are extended by rims 37 extending in the upstream direction and radially spaced from the corresponding shells.

The cylindrical part 25 of the assembly 30 is mounted in the cylindrical part 28 of the bottom wall 16. The upstream end of the cylindrical part 25 of the assembly 30 axially abuts the shoulder 29. The cylindrical part 25 of the assembly 30 is attached by brazing or welding to the cylindrical part 28 of the chamber bottom 16, in particular at the corresponding cylindrical surfaces 38 (FIG. 6), or even also at the annular radial surface forming the shoulder 29.

Figure 7:
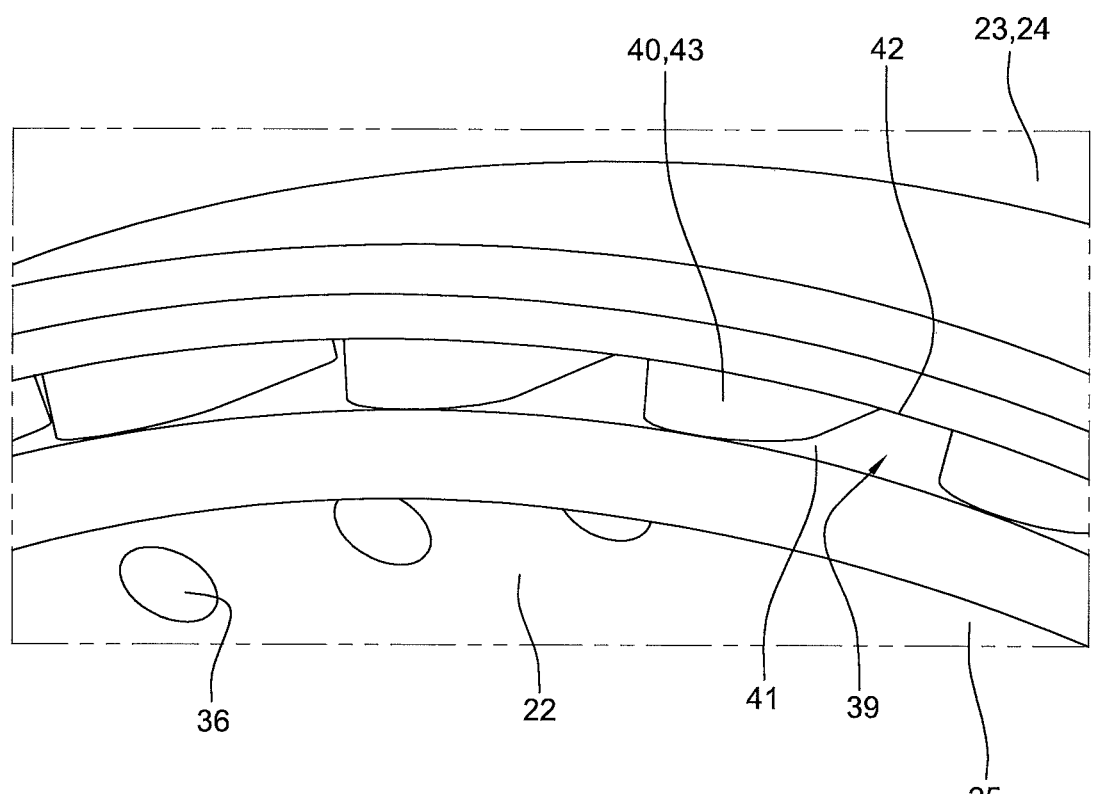
FIG. 7 is a detailed view of FIG. 5.

Channels 39 are formed in the cylindrical axial part 25 of the baffle 23, the channels 39 being evenly distributed over the circumference. The channels 39 are separated in pairs by axially extending connecting walls 40 (FIG. 7). Each channel 39 is delimited by a radially inner surface 41, a radially outer surface 42 and by the surfaces of the two corresponding adjacent connecting walls 40.

The radially inner and outer surfaces 41, 42 are coaxial and cylindrical, for example.

The upstream end 43 of each connecting wall 40 can be rounded to facilitate the introduction of the cooling air into the channels 39, thus limiting pressure drops. The term rounded can refer to a complex shape with a rounded portion, for example having a triangular end with a rounded top.

The downstream end of each channel 39 opens out opposite the radially inner base part 44 of the radial part of the baffle 23 (FIG. 6), i. e. at the connecting area 44 between the radial part 24 of the baffle 23 and the downstream end of the axial part 25. This connection area 44 may have a fillet.

Each channel 39 can have a cross-section with a radial and/or circumferential dimension between 15 and 35 mm.

The assembly 30 can be made of a nickel- and/or cobalt-based super alloy. The assembly 30 can be produced using an additional manufacturing method, for instance using selective melting or selective powder sintering, with an electron beam or a laser beam.

In operation, the cooling air from the high-pressure compressor enters the channels 39 and impacts the base 44 of the radial part 24 of the baffle 23 and then circulates in the space 45 axially provided between said radial part 24 and the bottom of the chamber 16 before reaching the combustion chamber 5 through the space 46 (FIG. 4) between the rims 37 and the shells 11, 12.

This cooling air effectively cools the axial part 25 of the assembly 30 and the base 44 of the radial part 24, which are the most critical areas in terms of thermal stress. This avoids the appearance of seams or cracks in order to increase the service life of the assembly 30.

The invention claimed is:

1. A combustion chamber for a turbomachine having a bottom wall, at least one mixing bowl for promoting the mixing of air and fuel, mounted in an opening in the bottom wall, at least one annular baffle mounted axially downstream of the bottom wall, with respect to the direction of the gas flow within the combustion chamber, around said opening, the baffle being produced in one piece with the mixing bowl so as to form a one-piece assembly, wherein said assembly comprises at least one channel for the flow of cooling air, said at least one channel comprising an air inlet located upstream of the bottom wall and an air outlet located downstream of the bottom wall, wherein the at least one channel is perpendicular to the baffle.

2. The combustion chamber according to claim 1, wherein said assembly comprises a cylindrical attachment part, attached to the bottom wall and mounted radially inside the opening, the baffle comprising a radially inner base part connected to said attachment part, the channel being provided in the cylindrical attachment part, the air outlet of the channel being located opposite a base of the baffle.

3. The combustion chamber according to claim 1, wherein the combustion chamber comprises at least one air intake swirler capable of generating a rotary air flow, located upstream of the mixing bowl.

4. The combustion chamber according to claim 2, wherein the attachment part extends axially in the upstream direction from the radially outer periphery of the mixing bowl, the baffle extending radially outwardly from the radially outer periphery of the mixing bowl.

5. The combustion chamber according to claim 1, wherein the assembly comprises a plurality of channels intended for the flow of cooling air, evenly distributed over the circumference.

6. The combustion chamber according to claim 1, wherein the cross-section of each channel is substantially constant from the upstream end of said channel to the downstream end of said channel.

7. The combustion chamber according to claim 1, wherein the cross-section of each channel axially decreases in the downstream direction.

8. The combustion chamber according to claim 1, wherein the at least one channel for the flow of cooling air is delimited by a radially inner surface and a radially outer surface, in the form of a cylinder portion or cone portions, said radially inner and outer surfaces being coaxial.

9. The combustion chamber according to claim 5, wherein two adjacent channels are circumferentially separated by a connecting wall, said connecting wall having an upstream end and a downstream end, said upstream end being rounded.

10. The combustion chamber according to claim 1, wherein the cylindrical attachment part of the assembly is attached by brazing or welding to a cylindrical part of the bottom wall, formed in the radially inner periphery of the opening.

11. The combustion chamber according to claim 1, wherein the baffle extends radially in relation to a longitudinal axis of the opening.

12. The combustion chamber according to claim 1, wherein the bottom wall extends radially in relation to a longitudinal axis of the opening.

13. The combustion chamber according to claim 1, wherein a space is arranged axially between the baffle and the bottom wall and the at least one channel opens in the space.

14. The combustion chamber according to claim 1, wherein the air outlet is arranged to direct cooling air at an upstream side of the base of the baffle.

* * * * *